Dec. 15, 1925.
W. L. ADAMS
AUTOMOBILE BUMPER
Filed Sept. 14, 1925
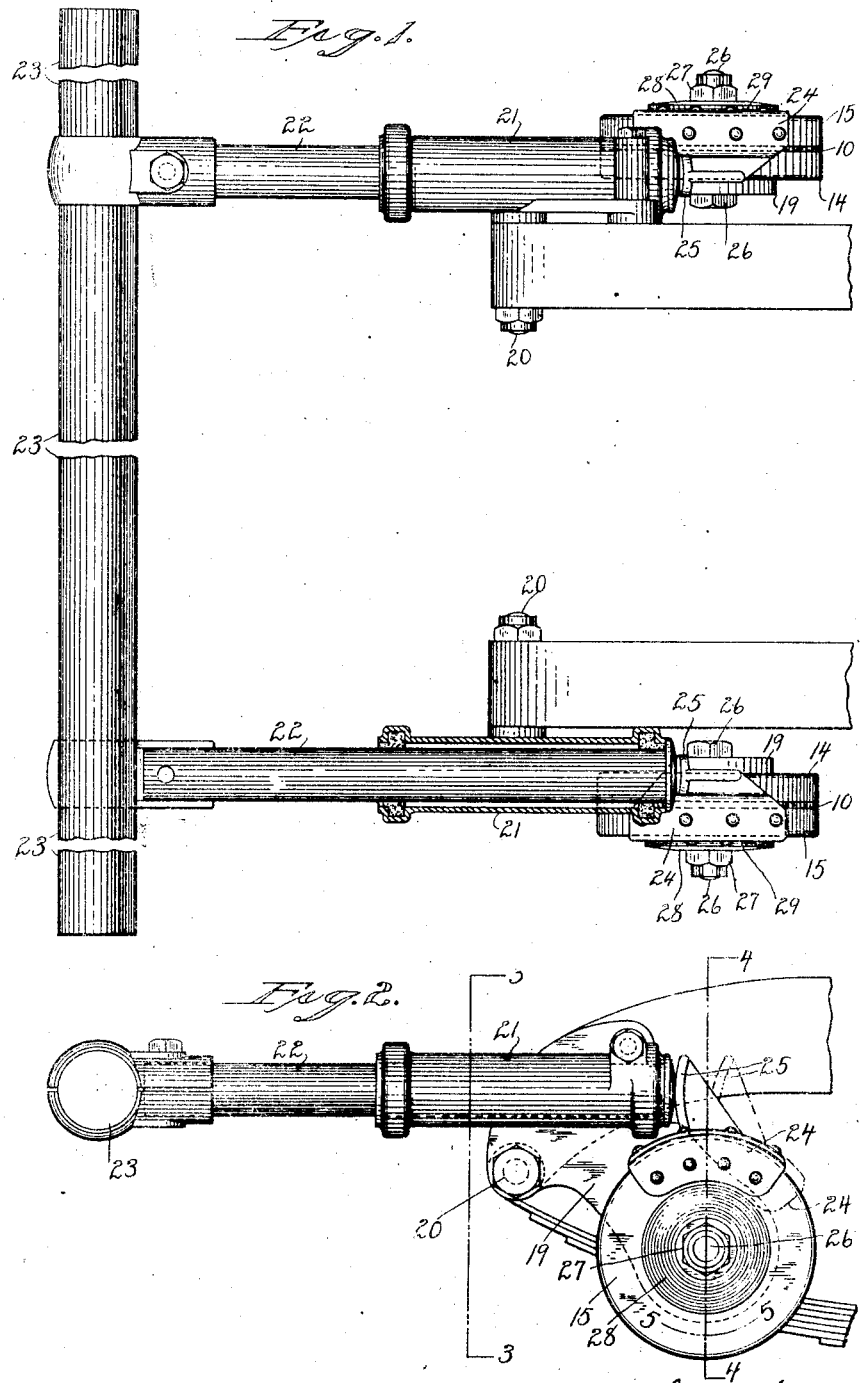

Dec. 15, 1925.  W. L. ADAMS  1,565,882
AUTOMOBILE BUMPER
Filed Sept. 14, 1925    2 Sheets-Sheet 2
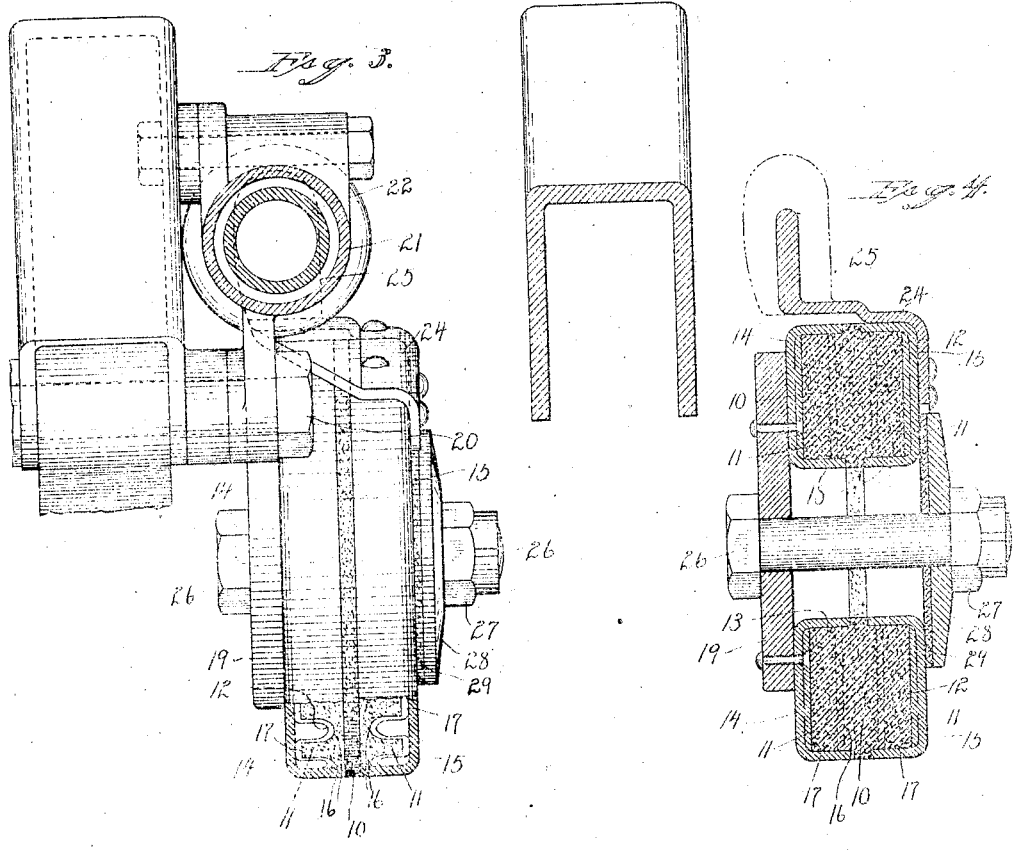
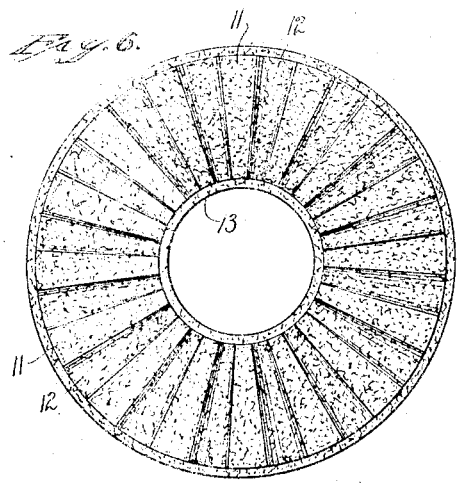
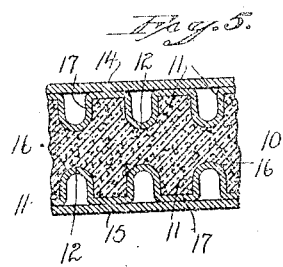

Patented Dec. 15, 1925.

1,565,832

UNITED STATES PATENT OFFICE.

WALTER LAWSON ADAMS, OF NEW HAVEN, CONNECTICUT.

AUTOMOBILE BUMPER.

Application filed September 14, 1925. Serial No. 56,132.

*To all whom it may concern:*

Be it known that I, WALTER LAWSON ADAMS, a subject of the King of Great Britain, residing at New Haven, in the county of New Haven and State of Connecticut, have invented a new and useful Improvement in Automobile Bumpers; and I do hereby declare the following, when taken in connection with the accompanying drawings, and the characters of reference marked thereon, to be a full, clear, and exact description of the same, and which said drawings constitute part of this application, and represent, in—

Fig. 1 a plan view, partly in section, of an automobile bumper constructed in accordance with my invention.

Fig. 2 a side view, partly in section, of the same.

Fig. 3 a sectional view on the line 3—3 of Fig. 2.

Fig. 4 a sectional view on the line 4—4 of Fig. 2.

Fig. 5 a sectional view on the line 5—5 of Fig. 2.

Fig. 6 a side view of the block, detached.

This invention relates to improvement in bumpers for automobiles, such as are commonly arranged at the front and back to take the impact, in case of collision. The object of the invention is to provide cushions for the bumper which will be sufficiently rigid to withstand the strain and yet so yielding that the impact of the bumper against an obstruction will not impart undue shock to the car, and the invention consists in the construction as hereinafter described and particularly recited in the claims.

In carrying out my invention, I employ blocks 10 of rubber, similar in construction to the rubber blocks shown in my suspension device for automobiles patented in the United States November 18, 1924, No. 1,515,716. These blocks are formed on opposite sides with ribs 11 and grooves 12, preferably arranged radially, and through the center of the block is a clearance-opening 13. These blocks are located between reversely-turned cups 14 and 15 struck up from sheet-metal. These cups are provided with alternating ribs 16 and grooves 17, and preferably these ribs and grooves will be formed by corrugating strips of sheet-metal which are secured to the cups by spot welding, or otherwise. These cups have annular flanges 18, to enter the central opening 13 in the blocks.

The cups 14 are connected by rivets, or otherwise, with suspension-plates 19, which plates are connected with the outside of the chassis-frame, being connected with the shackle-bolts 20. These plates also carry cylinders 21, into which bumper-rods 22 extend, these bumper-rods supporting a bumper-bar 23 at their outer ends.

The cups 15 have attached to them segmental-plates 24, formed with upwardly-projecting fingers 25 extending into the path of the bumper-rods 22. The block is held in place between the cups by a bolt 26 which bears at one end on the suspension-plate 19 and carries a nut 27 bearing on a clamping plate 28, forcing a fiber washer 29 against the outer faces of the cups 15.

An inward thrust upon the bumper-bar pushes the bumper-rods inward, against the fingers 25, which turn the cups 15 and hence give a torsional movement to the block 10. This takes the shock of impact against the bumper-bar, but is so yielding and easy in its movement that practically no shock is imparted to the car, the action of the block being the same as the blocks used in the suspension device of the patent above referred to.

While I prefer to form the ribs and grooves in the block radially, it is obvious that their direction might be slightly varied, so long as they provide for resisting torsional strain, and instead of forming the ribs and grooves for the cups, it is obvious, without illustration, that the cups might be formed with integral ribs and grooves.

It is obvious, also, that the form of bumper-bar may be varied to meet the requirements of construction or ornamentation of the cars to which they are applied.

I claim:

1. A bumper for automobiles, comprising a rubber block formed on opposite sides with ribs and grooves, a fixed member on one side of the block and a movable member on the other, the said members having ribs and grooves to engage with the ribs and grooves in the block, and a bumper-bar having parts arranged in line with and adapted to turn the movable members.

2. A bumper for automobiles, comprising rubber blocks formed on opposite sides with ribs and grooves, two cup-shaped members provided with ribs and grooves corresponding to the ribs and grooves in the block, which is located between them, means for rigidly mounting one of said members, a finger connected with the other member, a tubular bearing mounted in line with said finger, a bumper-rod extending through said bearing into engagement with said finger, and a bumper-bar connected with the outer end of said bumper-rod.

3. A bumper for automobiles, comprising a rubber block formed on the opposite sides with ribs and grooves, reversely-arranged cups, each having ribs and grooves formed of sheet-metal and connected with said cups and corresponding with the ribs and grooves in said block, one of said cups rigidly connected with a suspension-plate, said suspension-plate provided with a horizontally-arranged, tubular bearing, a bumper-rod extending through said bearing, a bar supported at the outer end of said bumper-rod, a plate secured to the other cup, a finger connected with said other cup and projecting upward into the path of movement of the bumper-rod.

In testimony whereof, I have signed this specification.

WALTER LAWSON ADAMS.